(12) United States Patent
Chien et al.

(10) Patent No.: US 8,370,772 B2
(45) Date of Patent: Feb. 5, 2013

(54) TOUCHPAD CONTROLLING METHOD AND TOUCH DEVICE USING SUCH METHOD

(75) Inventors: Chien-Pang Chien, Taipei (TW); Chih-Feng Chien, Taipei (TW); Chou-Liang Liu, Taipei (TW); Hung-Ming Lin, Taipei (TW); Chen-Ming Chang, Taipei (TW); Shi-Jie Zhang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 364 days.

(21) Appl. No.: 12/816,239

(22) Filed: Jun. 15, 2010

(65) Prior Publication Data

US 2011/0265021 A1 Oct. 27, 2011

(30) Foreign Application Priority Data

Apr. 23, 2010 (TW) ................................ 99112833 A

(51) Int. Cl.
 *G06F 3/033* (2006.01)
 *G06F 3/01* (2006.01)
 *G06F 3/048* (2006.01)
 *G06F 3/041* (2006.01)
 *G09G 5/00* (2006.01)

(52) U.S. Cl. ........ 715/863; 715/702; 715/856; 345/156; 345/173

(58) Field of Classification Search ................... 715/740, 715/856, 863; 345/173, 156
See application file for complete search history.

(56) References Cited

U.S. PATENT DOCUMENTS

| | | | | |
|---|---|---|---|---|
| 6,765,557 B1* | 7/2004 | Segal et al. | ................... | 345/173 |
| 7,054,965 B2* | 5/2006 | Bell et al. | ......................... | 710/72 |
| 2006/0026521 A1* | 2/2006 | Hotelling et al. | ............. | 715/702 |
| 2007/0075983 A1* | 4/2007 | Chiu et al. | ...................... | 345/173 |
| 2009/0040187 A1* | 2/2009 | Ko et al. | ........................ | 345/173 |
| 2009/0109183 A1* | 4/2009 | Carvajal et al. | ................ | 345/173 |
| 2009/0135152 A1* | 5/2009 | Lii | ................................. | 345/173 |
| 2009/0315841 A1* | 12/2009 | Cheng et al. | ..................... | 345/173 |
| 2010/0053099 A1* | 3/2010 | Vincent et al. | ................. | 345/173 |
| 2010/0088595 A1* | 4/2010 | Ho et al. | ........................ | 715/702 |
| 2011/0022990 A1* | 1/2011 | Wu et al. | ........................ | 715/856 |

* cited by examiner

*Primary Examiner* — Tadeese Hailu
*Assistant Examiner* — Nicholas Ulrich
(74) *Attorney, Agent, or Firm* — Kirton McConkie; Evan R. Witt

(57) ABSTRACT

A touchpad controlling method and a touch device using such a method are provided. The touch device is applied to an electronic appliance. The touch device includes a touchpad and a coordinate transformation program. The touchpad is used for detecting a number of touching points in response to the touching gesture on the touchpad and the position of each touching point. If the number of touching points is equal to 1, the electronic appliance is operated in a relative coordinate mode. Whereas, if the number of touching points is greater than 1, the electronic appliance is operated in an absolute coordinate mode.

11 Claims, 17 Drawing Sheets

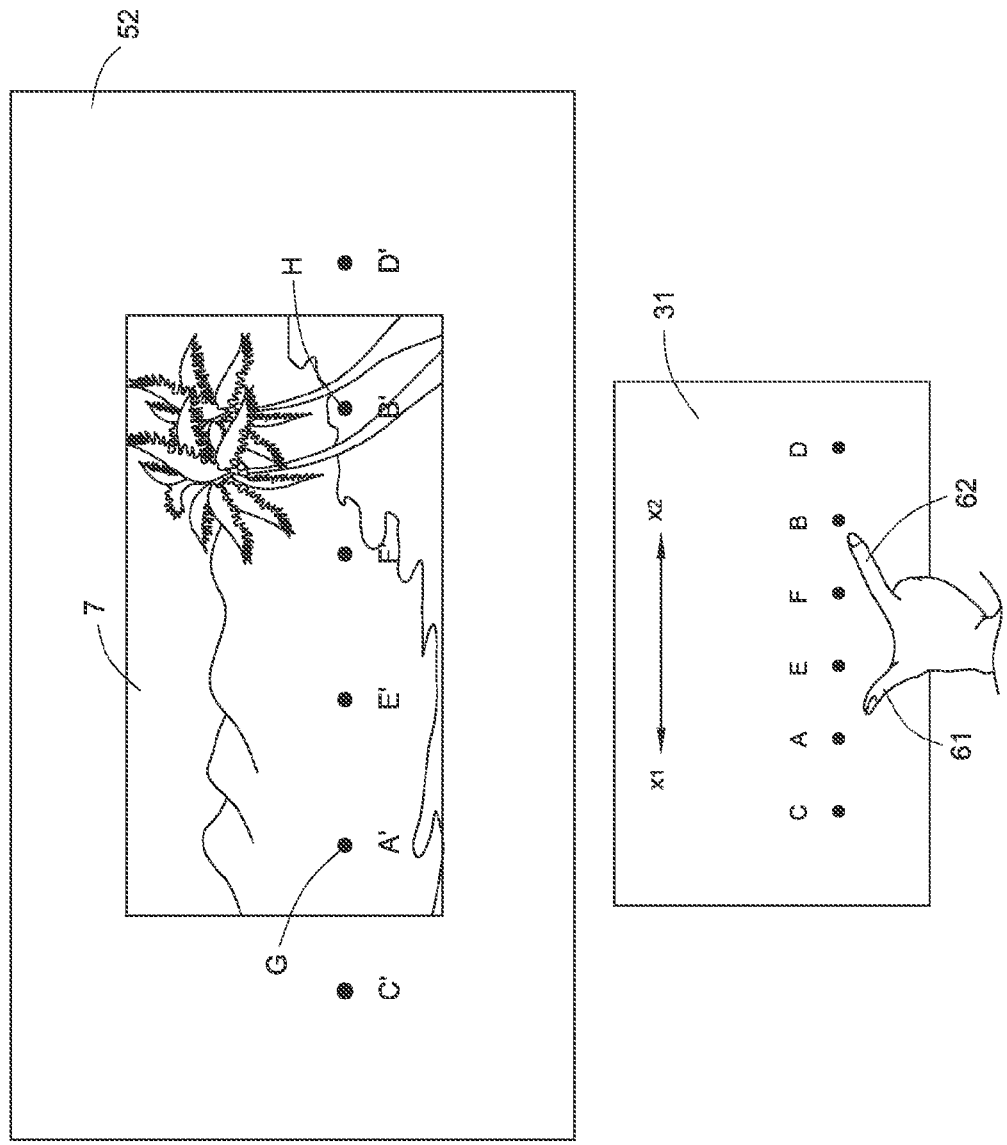

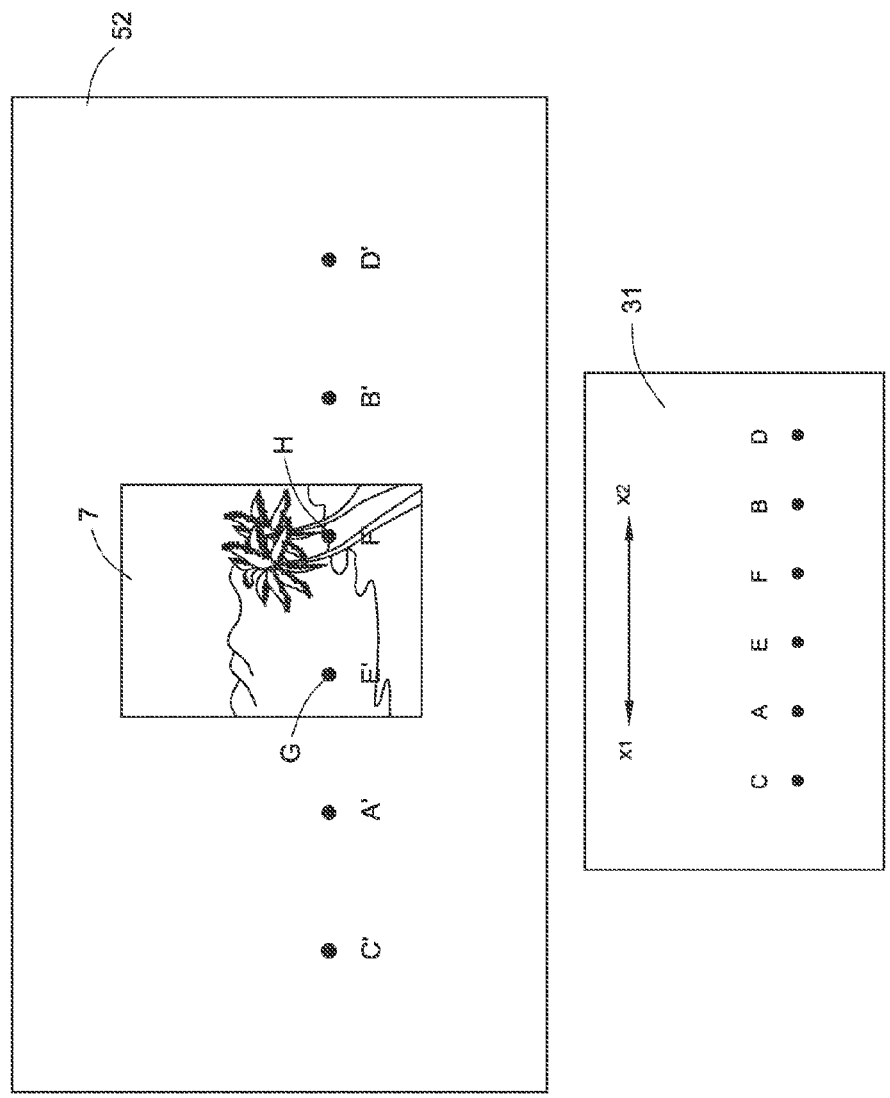

TOUCHPAD CONTROLLING METHOD AND TOUCH DEVICE USING SUCH METHOD

FIELD OF THE INVENTION

The present invention relates to a touchpad controlling method, and a touch device using such a method.

BACKGROUND OF THE INVENTION

With increasing development of science and technology, a variety of electronic appliances are designed in views of convenience and user-friendliness. For helping the user well operate the electronic appliances, the electronic appliances are gradually developed in views of humanization. The common electronic appliances include for example notebook computers, personal digital assistants (PDAs), mobile phones, satellite navigation devices, digital cameras, or the like. Recently, the storage capacity and the processor's computing performance for these electronic appliances are largely enhanced, and thus the functions thereof become more powerful and complicated. For efficiently operating an electronic appliance, a touchpad is used as an input device of the electronic appliance for controlling operations of the electronic appliance.

FIG. 1 is a schematic diagram illustrating a notebook computer and a touch device thereof according to the prior art. As shown in FIG. 1, the touch device 1 is installed on the base 21 of the notebook computer 2. The touch device 1 includes a touchpad 11, a left button 12 and a right button 13. For operating the notebook computer 2, the cursor 23 shown on a display screen 22 is moved by touching and moving a user's finger on the touchpad 11. The uses of the left button 12 and the right button 13 may implement some functions in replace of the conventional computer mouse. In other words, the user may operate the notebook computer 2 through the touch device 1 without the need of additionally carrying or installing the notebook mouse.

Conventionally, the touchpad 11 is operated to control movement of a cursor 23 shown on the display screen 22 in a relative coordinate mode. The way of controlling cursor movement in the relative coordinate mode is the same as the way for controlling the cursor with a mouse. That is, regardless of the actual position of the user's finger on the touchpad 11, the distance and the direction of the cursor are determined according to the direction and displacement between the final position and the initial position of the user's finger on the touchpad 11. Since the area of the touchpad 11 is much smaller than that of the display screen 22, if the user wants to move the cursor 23 from an end of the display screen 22 to another end of the display screen 22, the user has to slip the finger on the small area of the touchpad 11 repeatedly to accumulate enough amount of displacement. In other words, the way of controlling cursor movement in the relative coordinate mode is troublesome.

For solving the above drawbacks, the touchpad 11 is operated in an absolute coordinate mode to control the cursor movement on the display screen 22. In the absolute coordinate mode, any position on the display screen 22 corresponds to a specified position on the touchpad 11. The way of controlling cursor movement in the absolute coordinate mode is similar to the way for controlling the existing touch screen. For example, the user may move the cursor 23 to the middle of the display screen 22 by simply placing the user's finger on the middle of the touchpad 11. As known, the way of operating the touchpad 11 in the absolute coordinate mode fails to compete with the way of operating the touch screen because the area of the touchpad 11 is much smaller than that of the display screen. If the user wants to point and control a small object on the display screen by operating the touchpad 11, it is difficult to precisely move the cursor to the desired position. Although the increased area of the touchpad 11 may facilitate precisely positioning the cursor, the overall volume of the notebook computer will be increased and detrimental to carry.

For solving these drawbacks, several touch devices were disclosed for allowing the user to selectively operate the touchpad in the absolute coordinate mode or the relative coordinate mode according to the practical requirements. These touch devices were disclosed in for example Taiwanese Utility Patent No. 241746, Taiwanese Utility Patent No. 470193 and Chinese Patent Publication No. 1940837. However, the touch devices disclosed in these literatures need an additional hardware component or an additional mode-switching key for switching the operating mode of the touchpad between the absolute coordinate mode and the relative coordinate mode. In addition, during the touch process, if the user wants to switch the coordinate mode, the user needs to press the additional hardware component or key. In other words, the touching operation and the coordinate mode switching operation fail to be simultaneously done.

SUMMARY OF THE INVENTION

It is an object of the present invention to provide a touchpad controlling method and a touch device using such a method.

Another object of the present invention provides a touch device for automatically switching between the absolute coordinate mode and the relative coordinate mode during a touching operation is performed.

In accordance with an aspect of the present invention, there is provided a touchpad controlling method for moving a position of a cursor on a display screen of an electronic appliance or executing an instruction by sensing a touching gesture on a touchpad. In response to the touching gesture on the touchpad, at least one touching point is generated. Firstly, a number of touching points in response to the touching gesture on the touchpad and the position of each touching point are detected. If the number of touching points is equal to 1, the cursor and the instruction are operated in a relative coordinate mode. Whereas, if the number of touching points is greater than 1, the instruction is operated in an absolute coordinate mode.

In an embodiment, a position coordinate of any point on the touchpad is expressed by a first coordinate system, and a position coordinate of any point on the display screen is expressed by a second coordinate system. There is a first proportion between a horizontal axis of the first coordinate system and a horizontal axis of the second coordinate system. There is a second proportion between a vertical axis of the first coordinate system and a vertical axis of the second coordinate system.

In an embodiment, a position coordinate of the cursor shown on the display screen is expressed by the second coordinate system.

In an embodiment, the absolute coordinate mode is operated by the following steps. The position coordinate of each touching point, which is expressed by the first coordinate system, is outputted. Then, a datum point is selected, wherein the position coordinate of the datum point is expressed by the first coordinate system. Then the first coordinate system is shifted according to the datum point, so that the first coordinate system is transformed into a third coordinate system with the datum point serving as the origin, and the position coordinate of each touching point is transformed to be expressed by the third coordinate system. Then, the position coordinate of each touching point into the second coordinate system according to the position coordinate of the cursor, the first proportion and the second proportion, so that the position coordinate of each touching point is transformed to be expressed by the second coordinate system. Afterwards, a change of the position coordinate of each touching point is analyzed, so that the instruction is executed on a neighboring region of the position coordinate of the cursor.

In an embodiment, if the number of touching points is equal to 2, the position coordinate of the datum point is at a midpoint between the position coordinates of the two touching points.

In an embodiment, if the number of touching points is equal to 1, when a user's finger slides on the touchpad, the cursor shown on the display screen is moved in the relative coordinate mode.

In an embodiment, if the number of touching points is equal to 1, the instruction is executed to drag a document data shown on the display screen in the relative coordinate mode.

In an embodiment, if the number of touching points is greater than 1, the instruction is executed to zoom in, zoom out or rotate a document data shown on the display screen in the absolute coordinate mode.

In accordance with another aspect of the present invention, there is provided a touch device touchpad for use with an electronic appliance. The electronic appliance includes an operating system and a display screen. The touch device is used for controlling a position of a cursor on the display screen or executing an instruction by receiving a touching gesture. The touch device includes a touchpad and a coordinate transformation program. The touchpad is connected to the electronic device for receiving the touching gesture. At least one touching point is generated on the touchpad in response to the gesture on the touchpad. A number of touching points in response to the touching gesture on the touchpad and the position of each touching point are detected by the touchpad. The cursor and the instruction are operated in a relative coordinate mode if the number of touching points is equal to 1. The instruction is operated in an absolute coordinate mode if the number of touching points is greater than 1. The coordinate transformation program is installed in the electronic appliance. If the number of touching points is greater than 1, the coordinate transformation program is executed for transforming the position coordinate of each touching point, so that the instruction is executed on a neighboring region of the cursor shown on the display screen by the operating system.

In an embodiment, a position coordinate of any point on the touchpad is expressed by a first coordinate system, and a position coordinate of any point on the display screen is expressed by a second coordinate system. There is a first proportion between a horizontal axis of the first coordinate system and a horizontal axis of the second coordinate system. There is a second proportion between a vertical axis of the first coordinate system and a vertical axis of the second coordinate system.

In an embodiment, a position coordinate of the cursor shown on the display screen is expressed by the second coordinate system.

In an embodiment, if the number of touching points is greater than 1, the position coordinate of each touching point is outputted from the touchpad to the coordinate transformation program, and the position coordinate of each touching point is expressed by the first coordinate system.

In an embodiment, after the position coordinate of each touching point is outputted from the touchpad to the coordinate transformation program, the coordinate transformation program select a datum point, which is expressed by the first coordinate system, and shift the first coordinate system according to the datum point, so that the first coordinate system is transformed into a third coordinate system with the datum point serving as the origin, and the position coordinate of each touching point is transformed to be expressed by the third coordinate system. The third coordinate system is further transformed into the second coordinate system by the coordinate transformation program according to the position coordinate of the cursor, the first proportion and the second proportion, so that the position coordinate of each touching point is transformed to be expressed by the second coordinate system. The position coordinate of each touching point expressed by the second coordinate system is then transmitted to the operating system.

In an embodiment, if the number of touching points is equal to 2, the position coordinate of the datum point is at a midpoint between the position coordinates of the two touching points.

In an embodiment, when the position coordinate of each touching point expressed by the second coordinate system and transmitted from the coordinate transformation program is received by the operating system, a change of the position coordinate of each touching point is analyzed by the operating system, so that the instruction is executed on a neighboring region of the cursor by the operating system.

In an embodiment, if the number of touching points is equal to 1, when a user's finger slides on the touchpad, the cursor shown on the display screen is moved in the relative coordinate mode.

In an embodiment, if the number of touching points is equal to 1, the instruction is executed to drag a document data shown on the display screen in the relative coordinate mode.

In an embodiment, if the number of touching points is greater than 1, the instruction is executed to zoom in, zoom out or rotate a document data shown on the display screen in the absolute coordinate mode.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 5A~5C schematically illustrate a controlling method of the touch device in the absolute coordinate mode according to an embodiment of the present invention;

DETAILED DESCRIPTION OF THE PREFERRED EMBODIMENT

Figure 1:
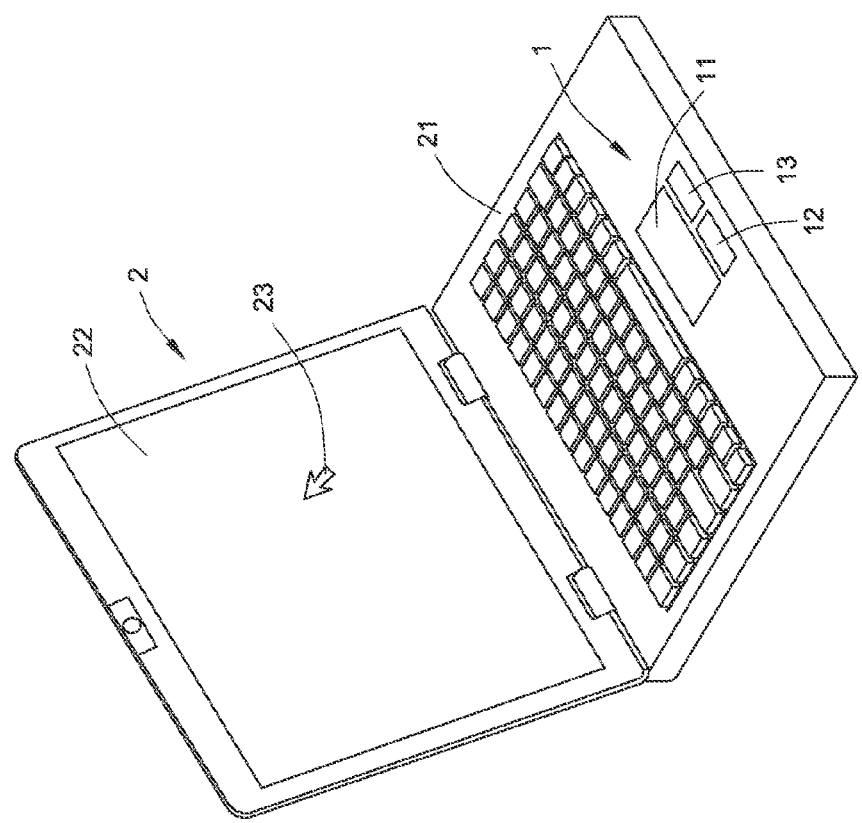
FIG. 1 is a schematic diagram illustrating a notebook computer and a touch device thereof according to the prior art.
Figure 2:
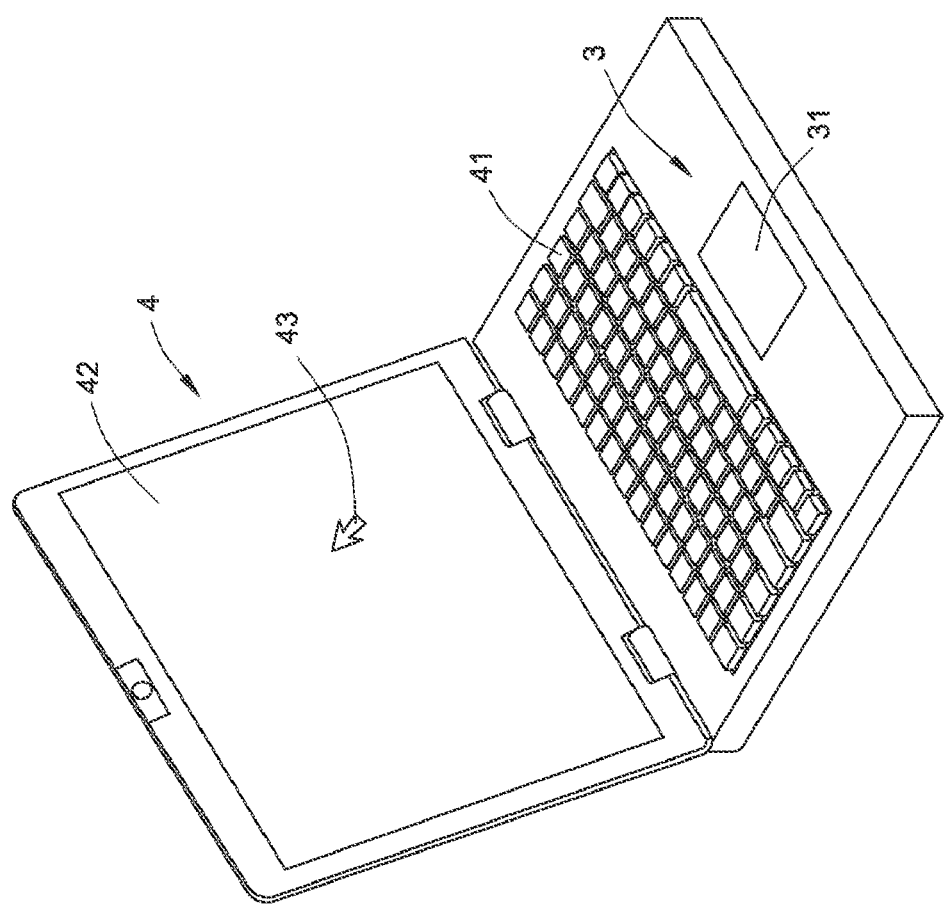
FIG. 2 is a schematic diagram illustrating the application of a touch device according to an embodiment of the present invention.
Figure 3:
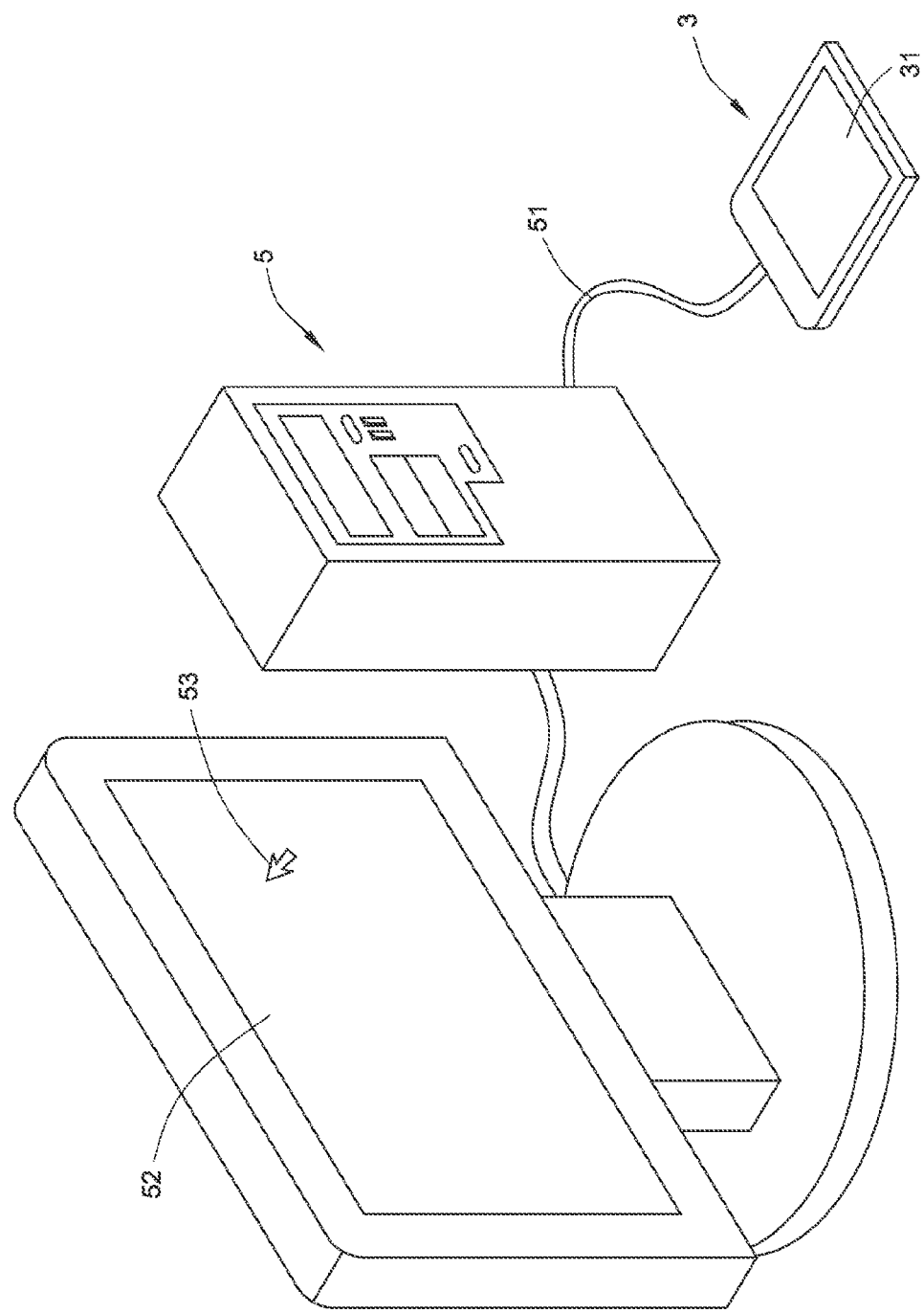
FIG. 3 is a schematic diagram illustrating the application of a touch device according to another embodiment of the present invention.

FIG. 2 is a schematic diagram illustrating the application of a touch device according to an embodiment of the present invention. FIG. 3 is a schematic diagram illustrating the application of a touch device according to another embodiment of the present invention. Please refer to FIGS. 2 and 3. The touch device 3 comprises a touchpad 31 and a coordinate transformation program. As shown in FIG. 2, the touchpad 31 is disposed in front of a keyboard 41 of a notebook computer 4. As shown in FIG. 3, the touchpad 31 is connected with a desktop computer 5 through a universal serial bus (USB) 51. The notebook computer 4 comprises an operating system and a display screen 42. Similarly, the desktop computer 5 comprises an operating system and a display screen 52. By sensing a user's touching gesture on the touchpad 31, the cursor 43 or 53 shown on the display screen 42 or 52 is correspondingly moved, or a corresponding instruction is executed. As a consequence, the purpose of operating the notebook computer 4 or the desktop computer 5 is achieved.

Moreover, in response to the user's touching gesture on the touchpad 31, at least a touching point is generated. The touchpad 31 may detect the number of touching points and the position of each touching point according to the touching gesture on the touchpad 31. The coordinate transformation program is installed in the notebook computer 4 or the desktop computer 5. By activating the coordinate transformation program under the operating system, an instruction is executed on the neighboring region of the cursor 43 or 53 of the display screen 42 or 52. The present invention is illustrated by referring to the touch device 3 of the notebook computer 4 or the desktop computer 5. Nevertheless, the touch device 3 may be applied to any remotely-controllable electronic appliance such as a television, a projector, or the like.

In accordance with the present invention, the touch device 3 is used to control the electronic appliance in a relative coordinate mode or an absolute coordinate mode. The operating mode is selected according to the number of touching points in response to a user's touching gesture on the touchpad 31.

Figure 4:
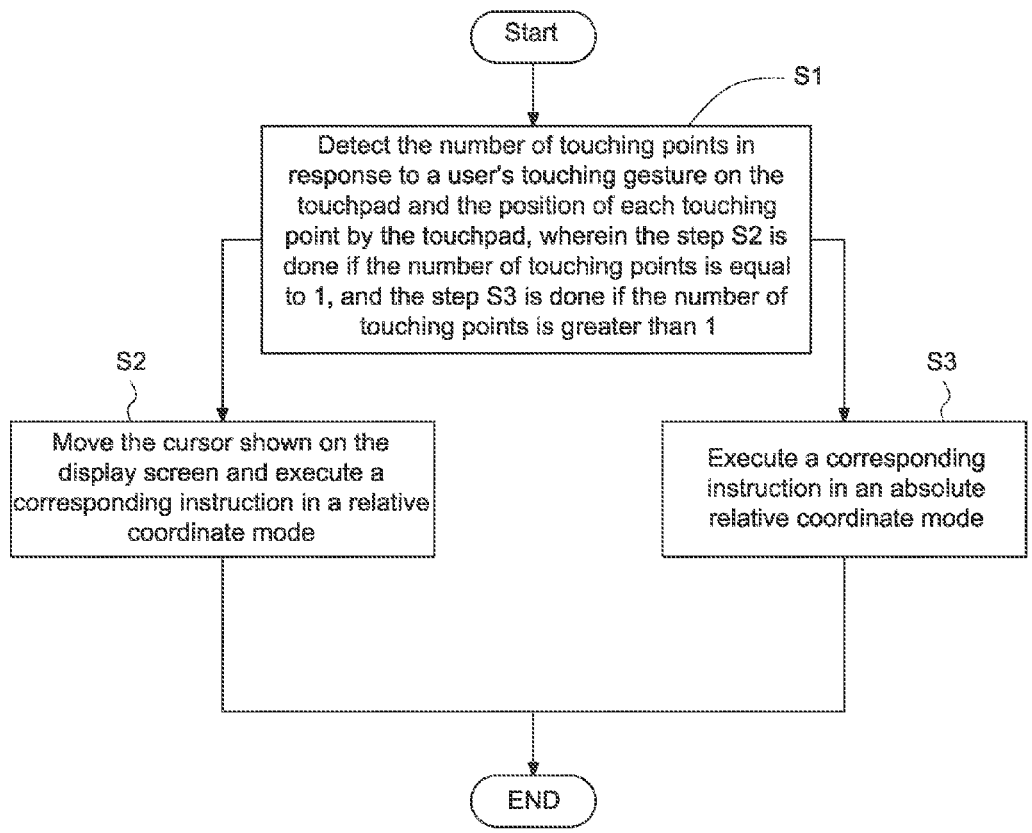
FIG. 4 is a flowchart illustrating a touchpad controlling method according to an embodiment of the present invention.

FIG. 4 is a flowchart illustrating a touchpad controlling method according to an embodiment of the present invention.

In the step S1, the number of touching points in response to a user's touching gesture on the touchpad 31 and the position of each touching point are detected by the touchpad 31. If the number of touching points is equal to 1, the step S2 is done. Whereas, if the number of touching points is greater than 1, the step S3 is done.

In the step S2, the cursor shown on the display screen is moved and a corresponding instruction is executed in a relative coordinate mode.

That is, when the user's finger slides on the touchpad 31, a cursor shown on the display screen is correspondingly moved. The way of controlling cursor movement in the relative coordinate mode is the same as the way for controlling the cursor with a mouse. That is, regardless of the actual position of the user's finger on the touchpad 31, the cursor movement is controlled according to the direction and displacement between the final position and the initial position of the user's finger on the touchpad 31.

Moreover, after the user's forefinger is placed on the touchpad 31 at the position corresponding to the title bar shown on the application window of the display screen, the forefinger may be moved on the touchpad 31, so that an instruction corresponding to a dragging action is executed. In this situation, the application window of the display screen is correspondingly moved as the forefinger slides on the touchpad 31. Similarly, the application window is moved in the relative coordinate mode. That is, regardless of the actual position of the user's finger on the touchpad 31, the movement of the application window is controlled according to the direction and displacement between the final position and the initial position of the user's finger on the touchpad 31.

In the step S3, the instruction is executed in an absolute coordinate mode.

That is, in the absolute coordinate mode, any position on the touchpad 31 corresponds to a specified position on the display screen. Hereinafter, the controlling method of the touch device in the absolute coordinate mode will be illustrated with reference to FIGS. 5 and 6. FIG. 5 schematically illustrates a controlling method of the touch device in the absolute coordinate mode according to an embodiment of the present invention. FIG. 6 schematically illustrates a controlling method of the touch device in the absolute coordinate mode according to another embodiment of the present invention.

Figure 5B:
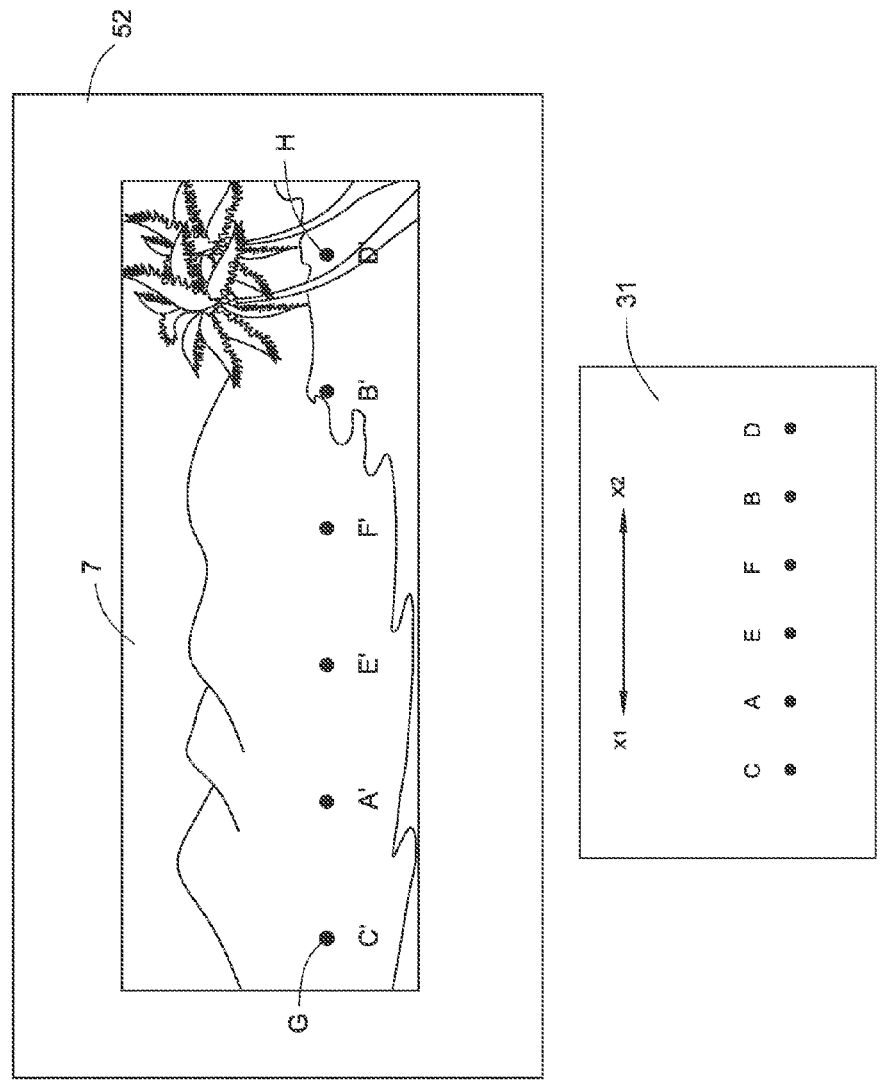

FIGS. 5A, 5B and 5C illustrate the processes of zooming in and zooming out the image of a document data 7 (e.g. a picture) shown the display screen 52 when the touch device is operated in an absolute coordinate mode. The points A, B, C, D, E and F of the touchpad 31 correspond to the points A', B', C', D', E' and F' of the display screen 52, respectively. In a case that the thumb 61 and the forefinger 62 are respectively placed on the points A and B of the touchpad 31, the points A' and B' of the display screen 52 correspond to the points G and H of the document data 7, respectively (see FIG. 5A). When the thumb 61 and the forefinger 62 are respectively moved in the directions X1 and X2 and the thumb 61 and the forefinger 62 are respectively stayed at the points C and D of the touchpad 31, the points G and H of the document data 7 will be respectively moved from the points A' and B' to the points C' and D'. As a consequence, the purpose of zooming in the image of the document data 7 is achieved (see FIG. 5B). Similarly, when the thumb 61 and the forefinger 62 are respectively moved in the directions X2 and X1 and the thumb 61 and the forefinger 62 are respectively stayed at the points E and F of the touchpad 31, the points G and H of the document data 7 will be respectively moved from the points C' and D' to the points E' and F'. As a consequence, the purpose of zooming out the image of the document data 7 is achieved (see FIG. 5C).

Figure 6A:
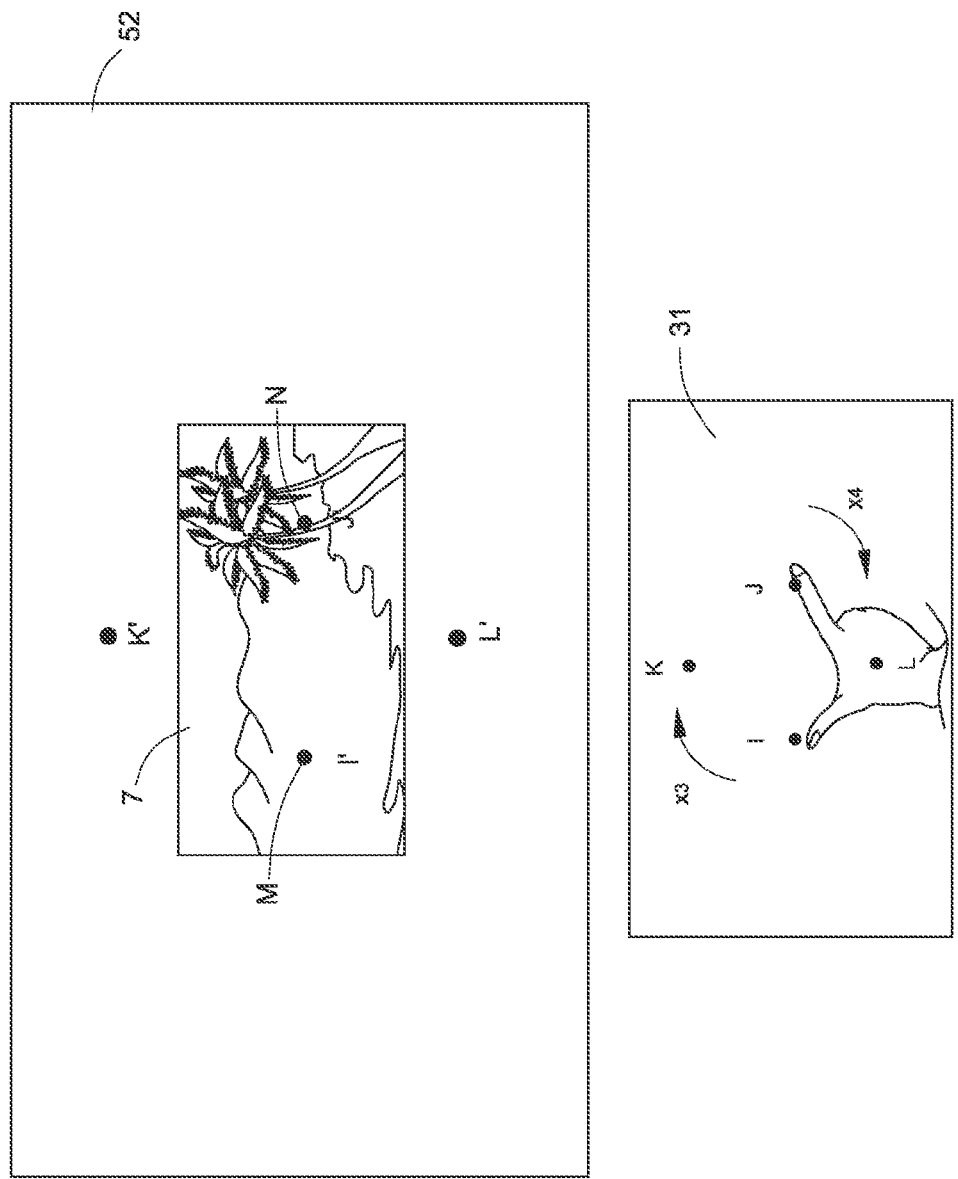
FIGS. 6A~6B schematically illustrates a controlling method of the touch device in the absolute coordinate mode according to another embodiment of the present invention.
Figure 6B:
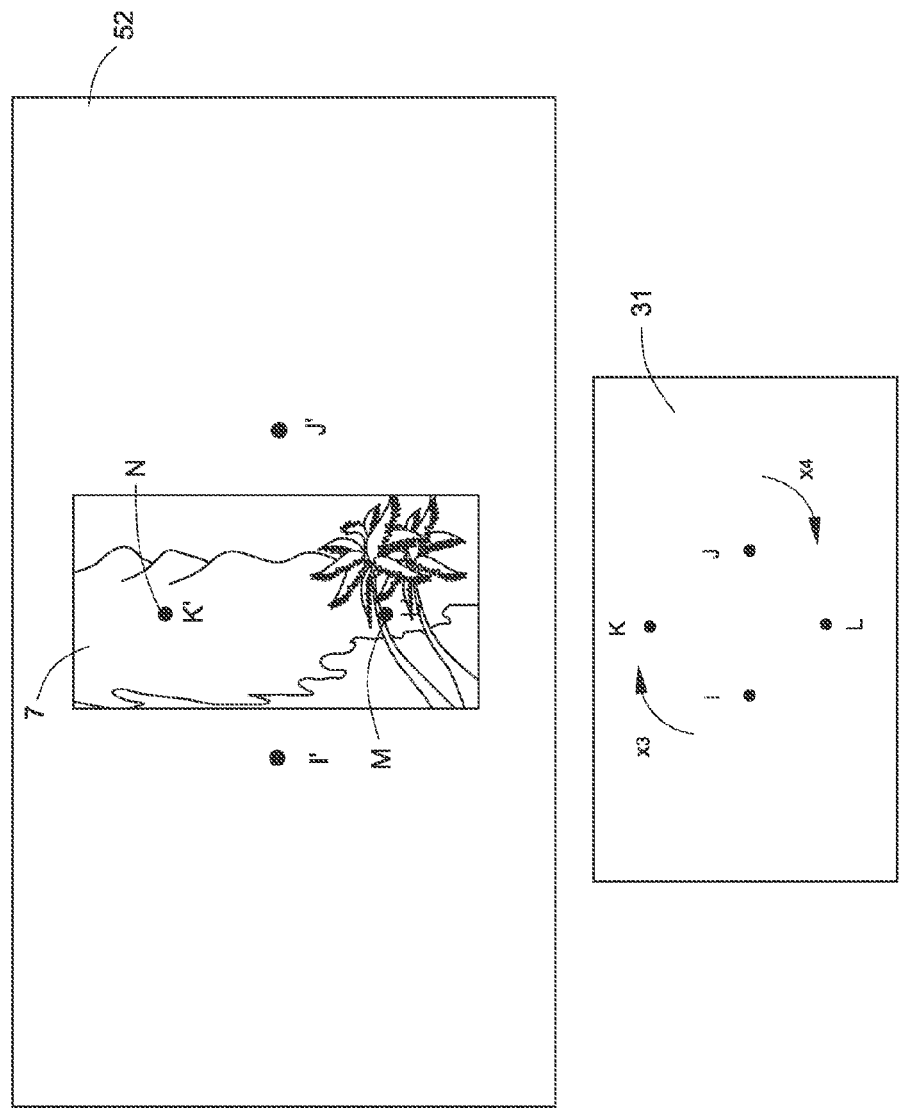

FIGS. 6A and 6B schematically illustrate the process of rotating the image of a document data 7 (e.g. a picture) shown the display screen 52 when the touch device is operated in the absolute coordinate mode. The points I, J, K and L of the touchpad 31 correspond to the points I', J', K' and L' of the display screen 52, respectively. In a case that the thumb 61 and the forefinger 62 are respectively placed on the points I and J of the touchpad 31, the points I' and J' of the display screen 52 correspond to the points M and N of the document data 7, respectively (see FIG. 6A). When the thumb 61 and the forefinger 62 are respectively rotated in the directions X3 and X4 and the thumb 61 and the forefinger 62 are respectively stayed at the points K and L of the touchpad 31, the points M and N of the document data 7 will be respectively moved from the points I' and J' to the points K' and L'. As a consequence, the purpose of rotating the image of the document data 7 is achieved (see FIG. 6B).

For executing an instruction to zoom in, zoom out or rotating a document data on the display screen for example, the user has to move the cursor on the display screen to the document data in advance, and then the instruction is executed by the operating system in response to the specified touching gesture. For example, if the document data is shown on a specified corner region of the display screen, the user has to firstly locate the cursor at the specified corner region. For executing the instruction in the absolute coordinate mode, the specified touching gesture is performed on a corresponding position of the touchpad 31 (i.e. a corner region of the touchpad 31). Since the area of the touchpad 31 is smaller than that of the display screen, it is difficult to precisely locate the user's finger on the corresponding position of the touchpad 31. In accordance with a key feature, the coordinate transformation program of the touch device 3 is effective for solving the above drawbacks, so that the operation of the touchpad 31 becomes more humanistic. Regardless of the position of the user's finger on the touchpad 31, the instruction may be executed on a neighboring region of the cursor as long as the touch device 3 is operated in the absolute coordinate mode. The reasons will be illustrated as follows.

Figure 7:
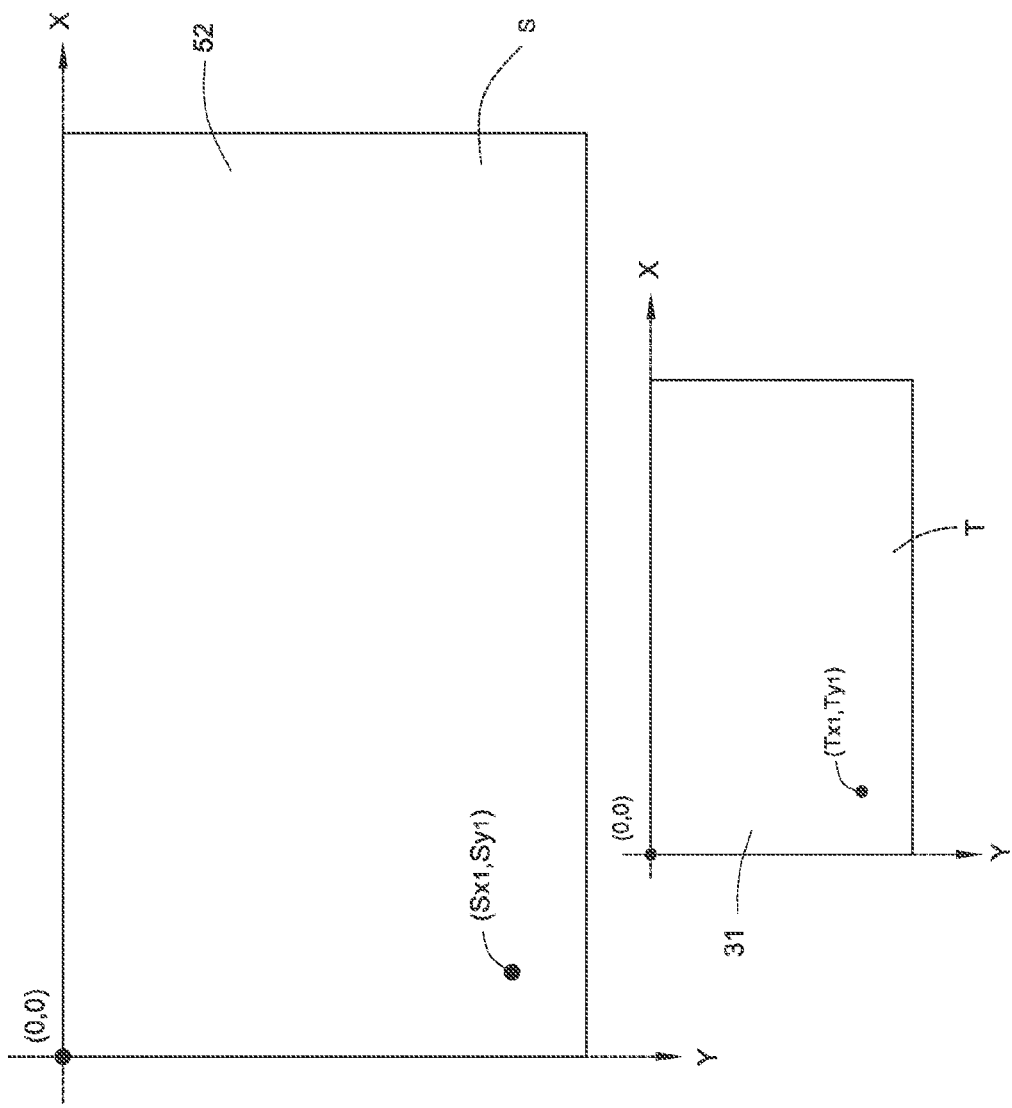
FIG. 7 is a schematic diagram illustrating the coordinate system of the touchpad and the display screen of the touch device according to an embodiment of the present invention.

FIG. 7 is a schematic diagram illustrating the coordinate system of the touchpad and the display screen of the touch device according to an embodiment of the present invention. The position coordinate of any point on the touchpad 31 is expressed by a first coordinate system T. The position coordinate of any point on the display screen 52 is expressed by a second coordinate system S. Of course, the position coordinate of the cursor shown on the display screen is also expressed by the second coordinate system S. The area of the touchpad 31 is different from that of the display screen 52. As such, there is a first proportion $P_x$ between the horizontal axis (X axis) of the first coordinate system T and the horizontal axis (X axis) of the second coordinate system S, and there is a second proportion $P_y$ between the vertical axis (Y axis) of the first coordinate system T and the vertical axis (Y axis) of the second coordinate system S. For example, if the position coordinate of any point on the touchpad 31 is indicated as $(T_{x1}, T_{y1})$, the position coordinate of any point on the display screen 52 is indicated as $(S_{x1}, S_{y1})$, wherein $S_{x1}=P_x \cdot T_{x1}$, and $S_{y1}=P_y \cdot T_{y1}$.

Figure 8:
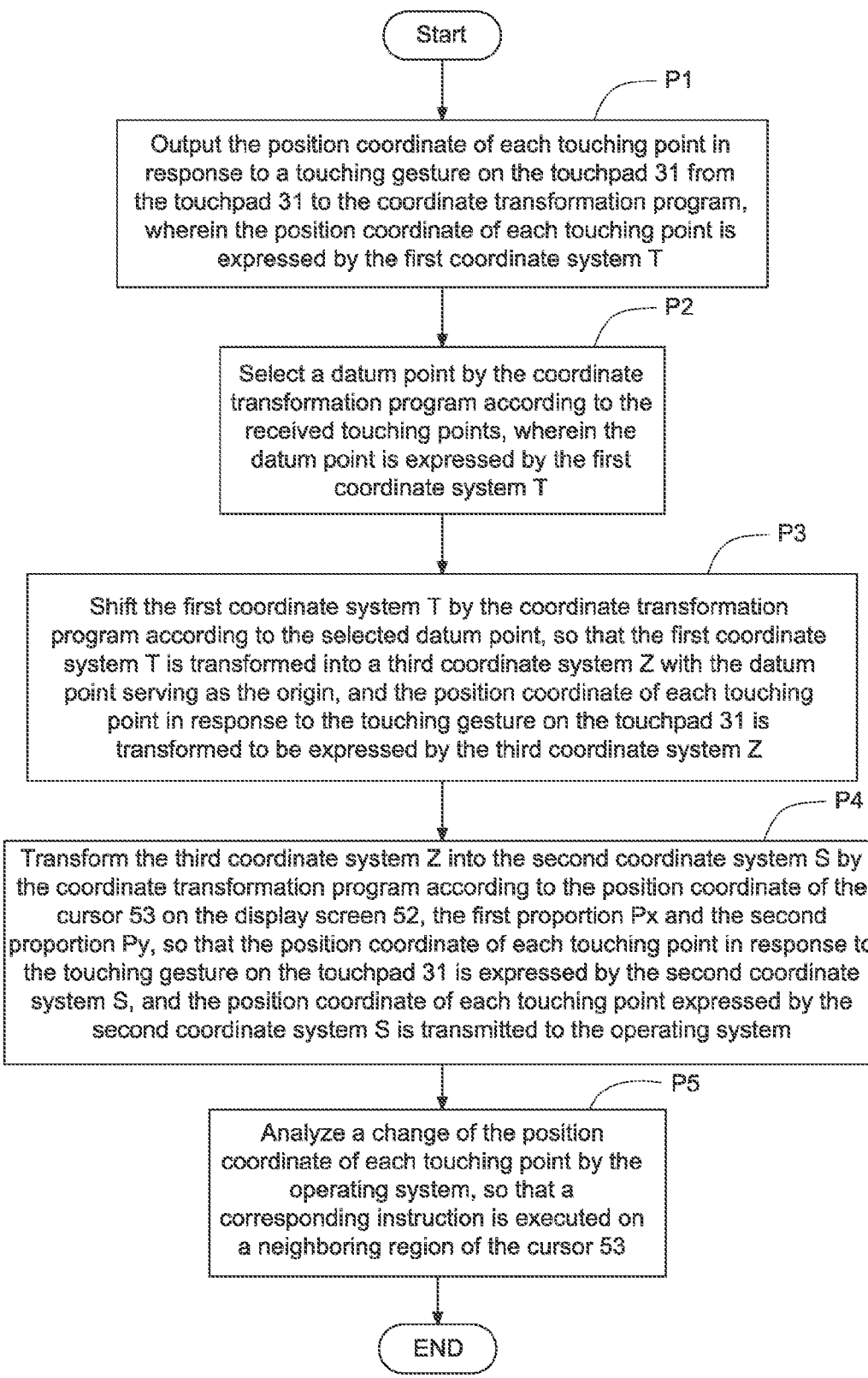
FIG. 8 is a flowchart illustrating an operating method of the touch device in the absolute coordinate mode according to the present invention.

Hereinafter, an operating method of the touch device in the absolute coordinate mode will be illustrated with reference to FIG. 8. FIG. 8 is a flowchart illustrating an operating method of the touch device in the absolute coordinate mode according to the present invention.

In the step P1, the position coordinate of each touching point in response to a touching gesture on the touchpad 31 is outputted from the touchpad 31 to the coordinate transformation program, wherein the position coordinate of each touching point is expressed by the first coordinate system T.

In the step P2, a datum point is selected by the coordinate transformation program according to the received touching points, wherein the datum point is expressed by the first coordinate system T. Preferably, once the number of the touching points in response to the touching gesture on the touchpad 31 is equal to 2, the midpoint between the two touching points is selected as the datum point.

In the step P3, the first coordinate system T is shifted by the coordinate transformation program according to the selected datum point. As such, the first coordinate system T is transformed into a third coordinate system Z with the datum point serving as the origin, and the position coordinate of each touching point in response to the touching gesture on the touchpad 31 is transformed to be expressed by the third coordinate system Z.

In the step P4, the third coordinate system Z is transformed into the second coordinate system S by the coordinate transformation program according to the position coordinate of the cursor 53 on the display screen 52, the first proportion $P_x$ and the second proportion $P_y$. As such, the position coordinate of each touching point in response to the touching gesture on the touchpad 31 is expressed by the second coordinate system S, and the position coordinate of each touching point expressed by the second coordinate system S is transmitted to the operating system.

In the step P5, the change of the position coordinate of each touching point is analyzed by the operating system, so that a corresponding instruction is executed on a neighboring region of the cursor 53.

Figure 9A:
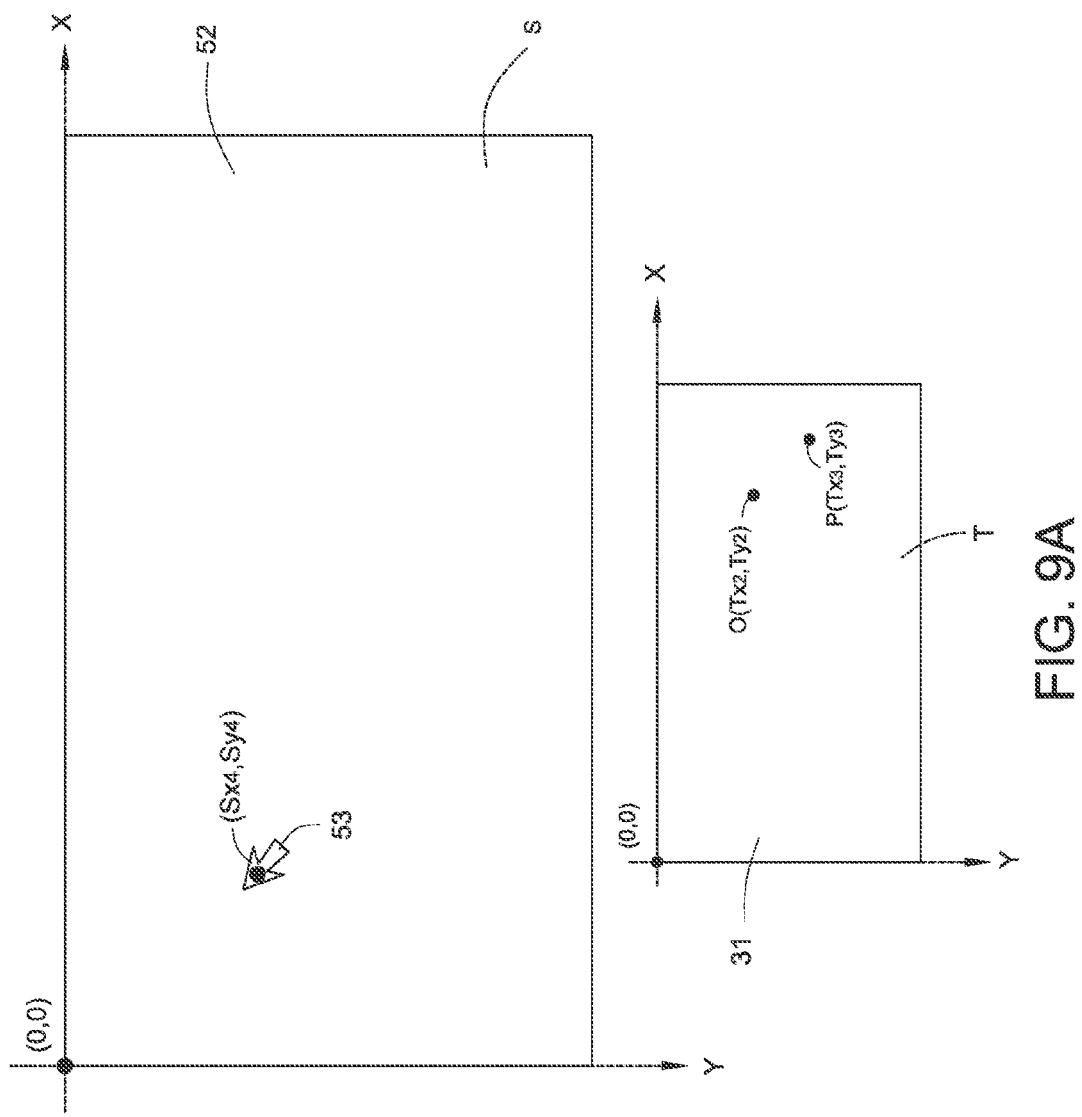
FIGS. 9A–9E is a schematic diagram illustrating an operating method of the touch device in the absolute coordinate mode.
Figure 9B:
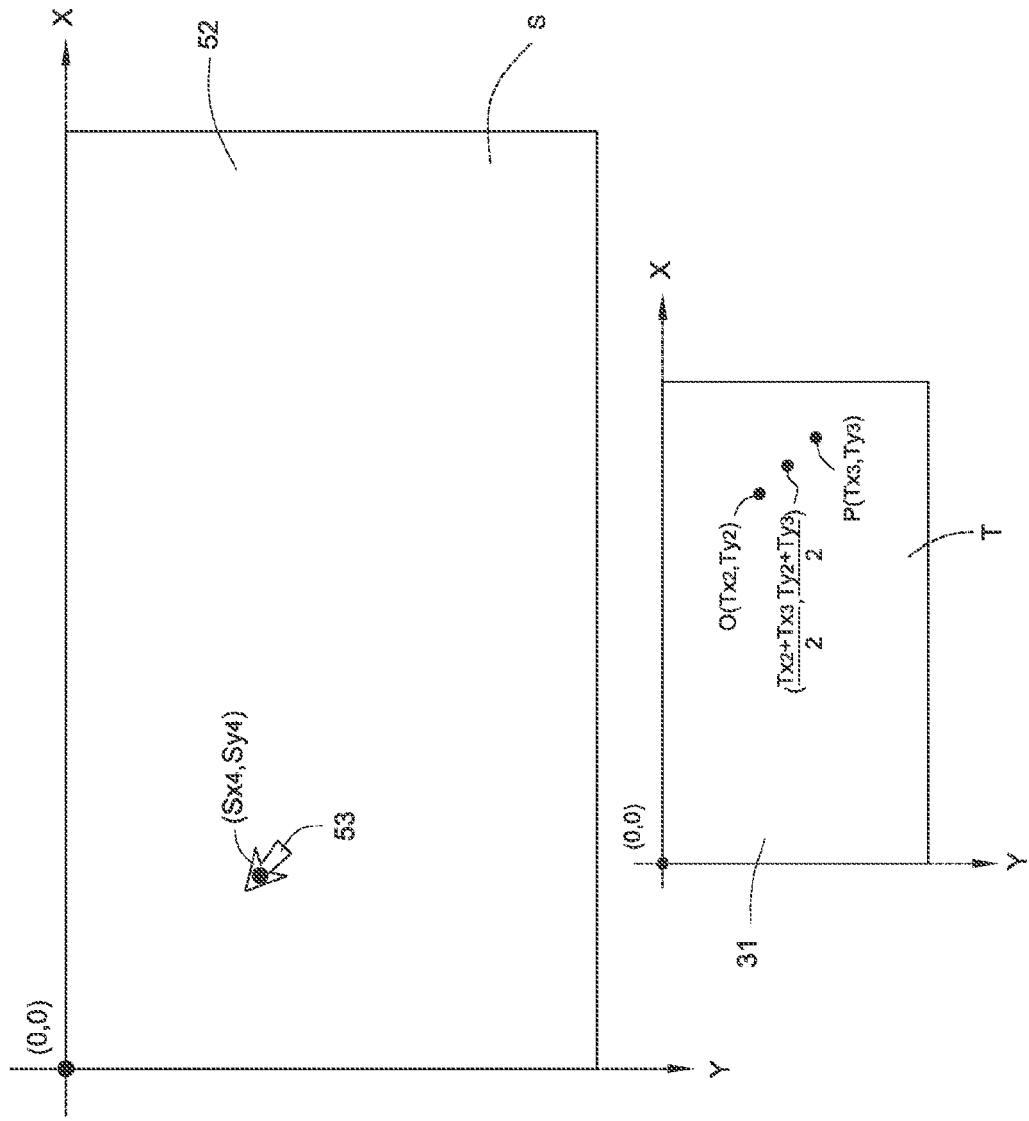
Figure 9C:
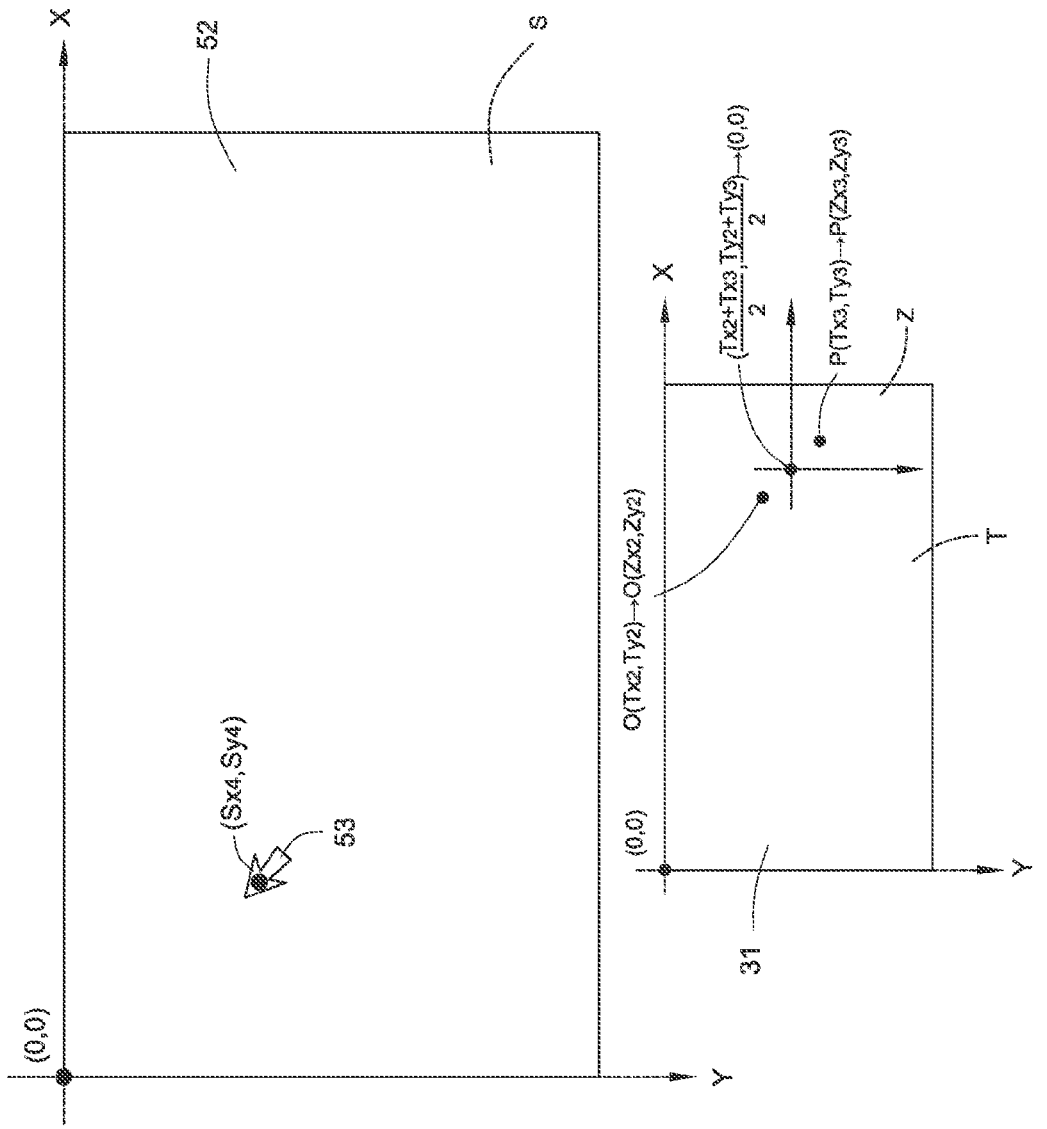
Figure 9D:
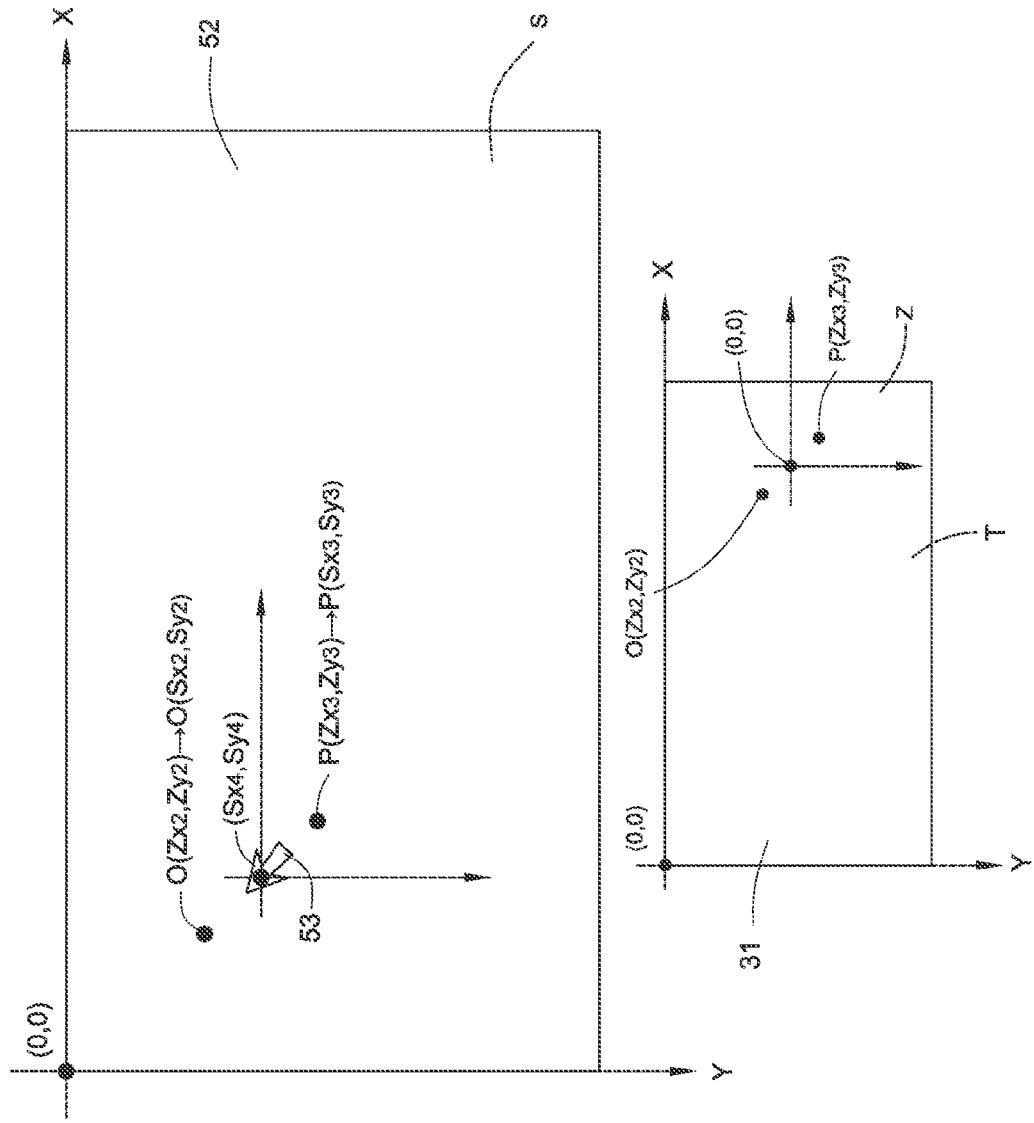

Hereinafter, a method of correlating the touching point of the touchpad 31 (in response to the user's touching gesture) with the neighboring region of the cursor 53 on the display screen 52, regardless of the position of the touching point, will be illustrated with reference to FIG. 9. FIG. 9 is a schematic diagram illustrating an operating method of the touch device in the absolute coordinate mode. As shown in FIG. 9A, any region of the touchpad 31 (e.g. the right region of the touchpad 31) is touched in response to the user's touching gesture, wherein the touching points include the points O and P. The position coordinates of the points O and P are expressed by the first coordinate system T, and respectively indicated as $(T_{x2}, T_{y2})$ and $(T_{x3}, T_{y3})$. Moreover, the cursor 53 shown on the display screen 52 is expressed by the second coordinate system S, and indicated as $(S_{x4}, S_{y4})$.

In the step P1, the position coordinates $(T_{x2}, T_{y2})$ and $(T_{x3}, T_{y3})$ of the points O and P are outputted from the touchpad 31 to the coordinate transformation program.

In the step P2, the midpoint between the two points O and P is selected as a datum point by the coordinate transformation program. As such, the position coordinate of the datum point is expressed by the first coordinate system T, and indicated as $((T_{x2}+T_{x3})/2, (T_{y2}+T_{y3})/2)$ (see FIG. 9B).

In the step P3, the first coordinate system T is shifted by the coordinate transformation program according to the selected datum point. As such, the first coordinate system T is transformed into a third coordinate system Z with the datum point $((T_{x2}+T_{x3})/2, (T_{y2}+T_{y3})/2)$ serving as the origin. In other words, the position coordinates of the two points O and P are transformed to be expressed by the third coordinate system Z, and respectively indicated as $(Z_{x2}, Z_{y2})$ and $(Z_{x3}, Z_{y3})$ (see FIG. 9C), wherein $$(Z_{x2}, Z_{y2}) = \left(T_{x2} - \frac{T_{x2}+T_{x3}}{2}, T_{y2} - \frac{T_{y2}+T_{y3}}{2}\right),$$

$$(Z_{x3}, Z_{y3}) = \left(T_{x3} - \frac{T_{x2}+T_{x3}}{2}, T_{y3} - \frac{T_{y2}+T_{y3}}{2}\right).$$

In the step P4, the third coordinate system Z is transformed into the second coordinate system S by the coordinate transformation program according to the position coordinate $(S_{x4}, S_{y4})$ of the cursor 53, the first proportion $P_x$ and the second proportion $P_y$. As such, the position coordinates of the points O and P are transformed to be expressed by the second coordinate system S, and respectively indicated as $(S_{x2}, S_{y2})$ and $(S_{x3}, S_{y3})$ (see FIG. 9D). Meanwhile, the position coordinates $(S_{x2}, S_{y2})$ and $(S_{x3}, S_{y3})$ of the points O and P are transmitted to the operating system, wherein $$(S_{x2},S_{y2})=\lfloor(S_{x4}+P_x\cdot Z_{x2}),(S_{y4}+P_y\cdot Z_{y2})\rfloor,$$

$$(S_{x3},S_{y3})=\lfloor(S_{x4}+P_x\cdot Z_{x3}),(S_{y4}+P_y\cdot Z_{y4})\rfloor.$$

By the above steps P1~P4, the position coordinate $(S_{x4}, S_{y4})$ of the cursor 53 is at the midpoint of the position coordinates $(S_{x2}, S_{y2})$ and $(S_{x3}, S_{y3})$ of the points O and P. Regardless of the touching points in response to the user's touching gesture on the touchpad 31, similar results are obtained. Of course, the way of selecting the datum point is not restricted as long as the position coordinate of each touching point expressed by the second coordinate system S is near the position coordinate of the cursor. As such, when the user wants to manipulate the document data pointed by the cursor 53 on the display screen 52, the user does not need to care about where the position of the cursor 53 on the display screen 52 corresponding to the position of the touchpad 31 is. By arbitrarily placing the touching gesture on any position of the touchpad 31, the touching points will correspond to the neighboring region of the cursor 53 on the display screen 52.

Figure 9E:
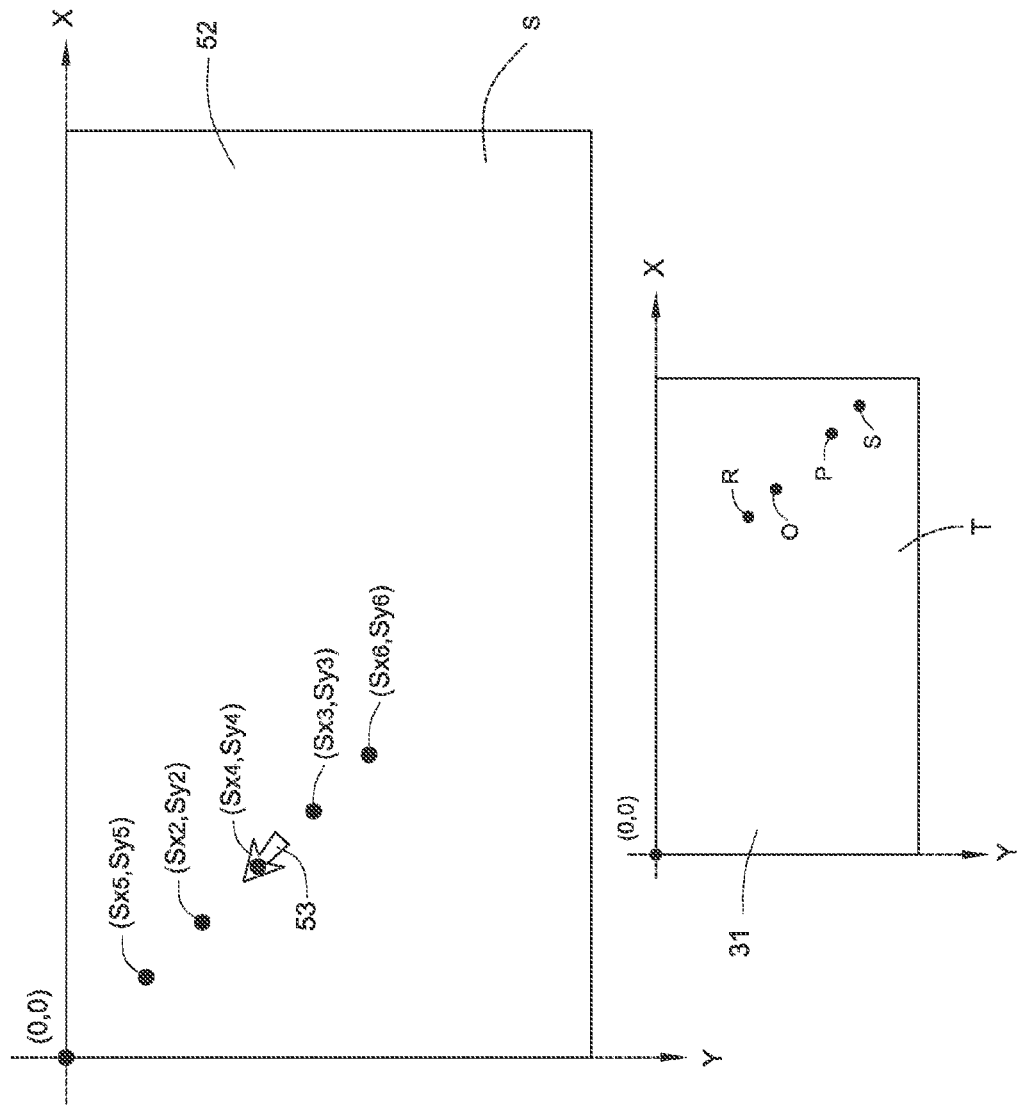

In the step P5, when the touching points in response to the user's touching gesture on the touchpad 31 are moved from the points O and P to the points R and S, the position coordinates received by the operating system are respectively changed from $(S_{x2}, S_{y2})$ and $(S_{x3}, S_{y3})$ to $(S_{x5}, S_{y5})$ and $(S_{x6}, S_{y6})$ (see FIG. 9E). By analyzing the position coordinate change, the operating system will realize what the instruction corresponding to the user's touching gesture needs to be executed. For example, once the instruction is executed, the purpose of zooming in the image of the document data is achieved. The procedure of zooming in the image of the document data is similar to that illustrated in FIG. 5B.

Figure 10:
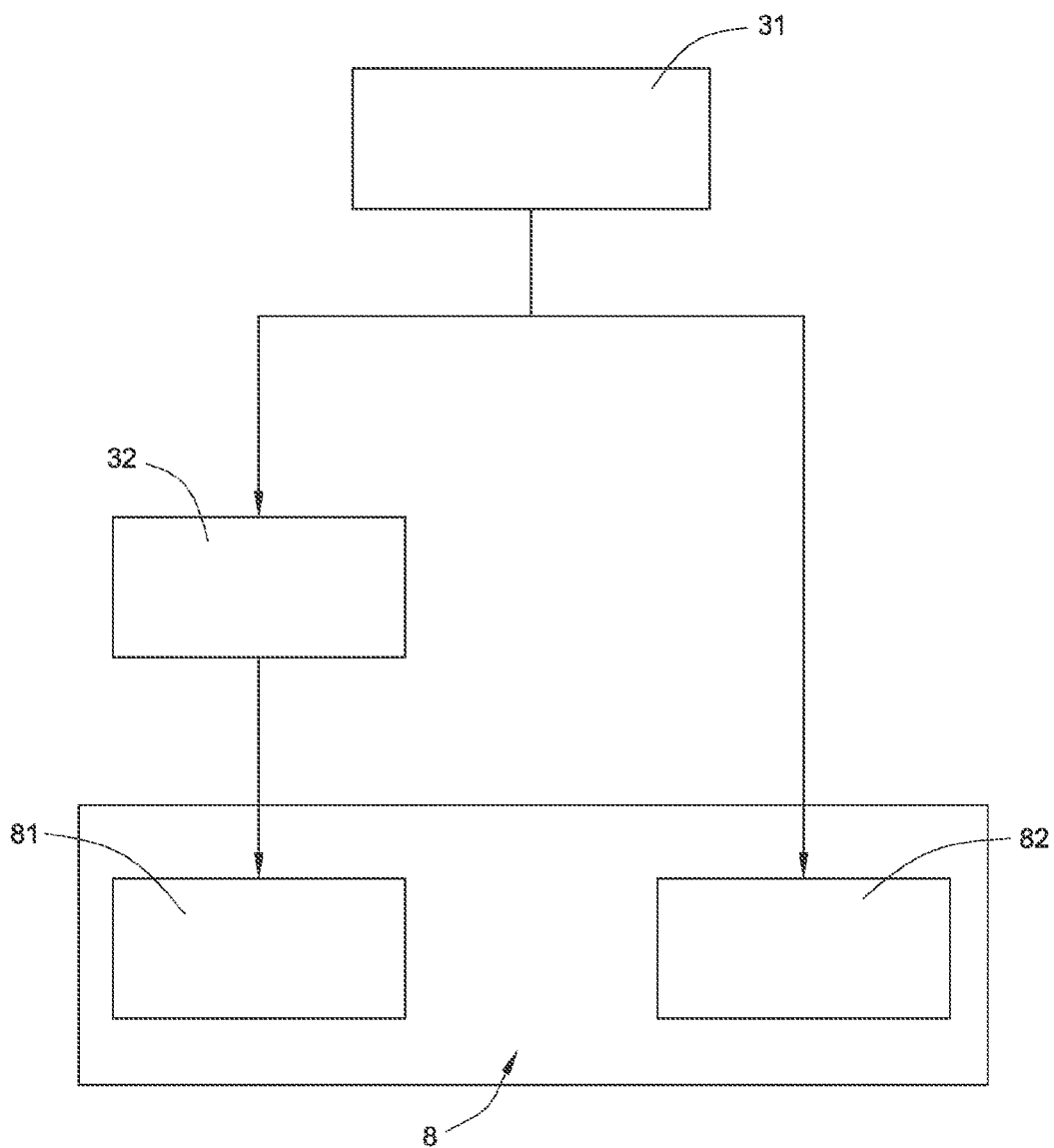
FIG. 10 is a schematic block diagram illustrating the touch device applied to a Windows 7 operating system according to an embodiment of the present invention.

Hereinafter, the relationship between the touch device 31 and the operating system of the electronic appliance according to the present invention will be illustrated with reference to FIG. 10. FIG. 10 is a schematic block diagram illustrating the touch device applied to a WINDOWS™ 7 operating system according to an embodiment of the present invention. WINDOWS™ 7 is an operating system 8, which is produced by MICROSOFT® Corporation and allows for multi-touch support. As such, the operating system 8 includes a multi-touch program 81 especially for receiving the position coordinate of each touching point and analyzing the position coordinate change of each touching point, thereby executing a corresponding instruction. Like the conventional operating system (e.g. WINDOWS™XP, WINDOWS™ 2000, ..., and so on), WINDOWS™ 7 also includes a mouse pointer program 82. If a single touching point is detected by the touchpad 31 of the touch device 3, the information associated with the final position relative to the initial position of the user's touching operation will be outputted from the touchpad 31 to the mouse pointer program 82. In this situation, the overall system is operated in the relative coordinate mode. If more than one touching point is detected by the touchpad 31 of the touch device 3, the position coordinate of each touching point is outputted from the touchpad 31 to the coordinate transformation program 32. The position coordinate of each touching point is transformed by the coordinate transformation program 32, and the transformed position coordinates are transmitted to the multi-touch program 81. In this situation, the overall system is operated in the absolute coordinate mode.

From the above description, the touch device 3 may determine whether the electronic appliance is operated in either a relative coordinate mode or an absolute coordinate mode by detecting the number of touching points in response to the user's gesture on the touchpad 31. This method allows for adaptively selecting a desired coordinate mode during the touching process without the need of pressing an additional hardware component or key of the electronic appliance. Moreover, by the coordinate transformation program 32 of the touch device 3 of the present invention, in the absolute coordinate mode, the user does not need to care about where the position of the cursor 53 on the display screen 52 corresponding to the position of the touchpad 31 is. By arbitrarily placing the touching gesture on any position of the touchpad 31 to create the touching gesture, the corresponding instruction will be executed on a neighboring region of the cursor 53.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touchpad controlling method for moving a position of a cursor on a display screen of an electronic appliance or executing an instruction by sensing a touching gesture on a touchpad, at least one touching point being generated in response to said touching gesture on said touchpad, said touchpad controlling method comprising steps of:

detecting a number of touching points in response to said touching gesture on said touchpad and a position of each touching point;

operating said cursor and said instruction in a relative coordinate mode if said number of touching points is equal to 1; and operating said instruction in an absolute coordinate mode if said number of touching points is greater than 1, wherein a position coordinate of any point on said touchpad is expressed by a first coordinate system, and a position coordinate of any point on said display screen is expressed by a second coordinate system, wherein there is a first proportion between a horizontal axis of said first coordinate system and a horizontal axis of said second coordinate system, and there is a second proportion between a vertical axis of said first coordinate system and a vertical axis of said second coordinate system, wherein a position coordinate of said cursor shown on said display screen is expressed by said second coordinate system, wherein said absolute coordinate mode is operated by steps of:

outputting said position coordinate of each touching point, which is expressed by said first coordinate system;

selecting a datum point, wherein a position coordinate of said datum point is expressed by said first coordinate system;

shifting said first coordinate system according to said datum point, so that said first coordinate system is transformed into a third coordinate system with said datum point serving as an origin, and said position coordinate of each touching point is transformed to be expressed by said third coordinate system;

transforming said position coordinate of each touching point into said second coordinate system according to said position coordinate of said cursor, said first proportion and said second proportion, so that said position coordinate of each touching point is transformed to be expressed by said second coordinate system; and analyzing a change of said position coordinate of each touching point, so that said instruction is executed on a neighboring region of said position coordinate of said cursor.

2. The touchpad controlling method according to claim 1 wherein if said number of touching points is equal to 2, said position coordinate of said datum point is at a midpoint between position coordinates of said two touching points.

3. The touchpad controlling method according to claim 1 wherein if said number of touching points is equal to 1, when a user's finger slides on said touchpad, said cursor shown on said display screen is moved in said relative coordinate mode.

4. The touchpad controlling method according to claim 1 wherein if said number of touching points is equal to 1, said instruction is executed to drag a document data shown on said display screen in said relative coordinate mode.

5. The touchpad controlling method according to claim 1 wherein if said number of touching points is greater than 1, said instruction is executed to zoom in, zoom out or rotate a document data shown on said display screen in said absolute coordinate mode.

6. A touch device touchpad for use with an electronic appliance, said electronic appliance comprising an operating system and a display screen, said touch device controlling a position of a cursor on said display screen or executing an instruction by receiving a touching gesture, said touch device comprising:

a touchpad connected to said electronic device for receiving said touching gesture, wherein at least one touching point is generated on said touchpad in response to said gesture on said touchpad, and a number of touching points in response to said touching gesture on said touchpad and a position of each touching point are detected by said touchpad, wherein said cursor and said instruction are operated in a relative coordinate mode if said number of touching points is equal to 1, and said instruction is operated in an absolute coordinate mode if said number of touching points is greater than 1; and a coordinate transformation program installed in said electronic appliance, wherein if said number of touching points is greater than 1, said coordinate transformation program is executed for transforming said position coordinate of each touching point, so that said instruction is executed on a neighboring region of said cursor shown on said display screen by said operating system, wherein a position coordinate of any point on said touchpad is expressed by a first coordinate system, and a position coordinate of any point on said display screen is expressed by a second coordinate system, wherein there is a first proportion between a horizontal axis of said first coordinate system and a horizontal axis of said second coordinate system, and there is a second proportion between a vertical axis of said first coordinate system and a vertical axis of said second coordinate system, wherein a position coordinate of said cursor shown on said display screen is expressed by said second coordinate system, wherein if said number of touching points is greater than 1, said position coordinate of each touching point is outputted from said touchpad to said coordinate transformation program, and said position coordinate of each touching point is expressed by said first coordinate system, wherein after said position coordinate of each touching point is outputted from said touchpad to said coordinate transformation program, said coordinate transformation program selects a datum point, which is expressed by said first coordinate system, and shift said first coordinate system according to said datum point, so that said first coordinate system is transformed into a third coordinate system with said datum point serving as an origin, and said position coordinate of each touching point is transformed to be expressed by said third coordinate system, wherein said third coordinate system is further transformed into said second coordinate system by said coordinate transformation program according to said position coordinate of said cursor, said first proportion and said second proportion, so that said position coordinate of each touching point is transformed to be expressed by said second coordinate system, wherein said position coordinate of each touching point expressed by said second coordinate system is then transmitted to said operating system.

7. The touch device according to claim 6 wherein if said number of touching points is equal to 2, a position coordinate of said datum point is at a midpoint between position coordinates of said two touching points.

8. The touch device according to claim 6 wherein when said position coordinate of each touching point expressed by said second coordinate system and transmitted from said coordinate transformation program is received by said operating system, a change of said position coordinate of each touching point is analyzed by said operating system, so that said instruction is executed on a neighboring region of said cursor by said operating system.

9. The touch device according to claim 6 wherein if said number of touching points is equal to 1, when a user's finger slides on said touchpad, said cursor shown on said display screen is moved in said relative coordinate mode.

10. The touch device according to claim 6 wherein if said number of touching points is equal to 1, said instruction is executed to drag a document data shown on said display screen in said relative coordinate mode.

11. The touch device according to claim 6 wherein if said number of touching points is greater than 1, said instruction is executed to zoom in, zoom out or rotate a document data shown on said display screen in said absolute coordinate mode.

* * * * *